US012700422B2

(12) United States Patent
Liu et al.

(10) Patent No.: US 12,700,422 B2
(45) Date of Patent: Aug. 4, 2026

(54) WRITE CURRENT UNDERSHOOT FOR A HEAT-ASSISTED MAGNETIC STORAGE DEVICE

(71) Applicant: SEAGATE TECHNOLOGY LLC, Fremont, CA (US)

(72) Inventors: Yanzhang Liu, Eden Prairie, MN (US); Zhen Wei, Maple Grove, MN (US); Jianhua Xue, Maple Grove, MN (US); Olle Gunnar Heinonen, Eden Prairie, MN (US); Michael Allen Seigler, Eden Prairie, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 18/902,185

(22) Filed: Sep. 30, 2024

(65) Prior Publication Data

US 2026/0094615 A1     Apr. 2, 2026

(51) Int. Cl.
*G11B 5/09* (2006.01)
*G11B 5/00* (2006.01)

(52) U.S. Cl.
CPC ........ *G11B 5/09* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 6,184,727 B1 * | 2/2001 | Price, Jr. .............. | H03K 17/662 |
| | | | 327/377 |
| 6,512,645 B1 * | 1/2003 | Patti ......................... | G11B 5/02 |
| | | | 360/68 |
| 8,730,609 B1 * | 5/2014 | Tang ................ | G11B 20/10268 |
| | | | 360/25 |
| 9,978,401 B1 * | 5/2018 | Rivkin ............. | G11B 20/10009 |
| 11,495,249 B1 * | 11/2022 | Gilbert .................... | G11B 5/012 |
| 2001/0022699 A1 * | 9/2001 | Lacombe ................. | G11B 5/02 |
| | | | 360/68 |
| 2003/0090828 A1 * | 5/2003 | Venca ..................... | G11B 5/022 |
| | | | 360/61 |
| 2004/0070862 A1 * | 4/2004 | Ranmuthu ............. | G11B 20/10 |
| | | | 360/68 |
| 2004/0184177 A1 * | 9/2004 | Doi .......................... | G11B 5/09 |
| | | | 360/68 |
| 2012/0275279 A1 * | 11/2012 | Wilson ..................... | G11B 5/02 |
| | | | 360/59 |
| 2014/0086034 A1 * | 3/2014 | Matousek .............. | G11B 27/36 |
| | | | 369/53.41 |
| 2014/0104000 A1 * | 4/2014 | Gerstenhaber ........ | H03F 1/3211 |
| | | | 330/257 |

(Continued)

*Primary Examiner* — Peter Vincent Agustin
(74) *Attorney, Agent, or Firm* — Mueting Raasch Group

(57)     ABSTRACT

An apparatus includes a write head. A preamplifier is coupled to the write head. A controller is coupled to the preamplifier and configured to cause the preamplifier to apply an overshoot current to the write head for a predefined overshoot current duration, apply an undershoot current to the write head for a predefined undershoot current duration, and apply a steady-state current to the write head after the undershoot current duration, the steady-state current being greater than the undershoot current.

20 Claims, 13 Drawing Sheets

(56) References Cited

U.S. PATENT DOCUMENTS

| | | | | |
|---|---|---|---|---|
| 2015/0170699 A1* | 6/2015 | Dakroub | ................. | G11B 5/02 |
| | | | | 369/13.33 |
| 2015/0333474 A1* | 11/2015 | Barnett | .................. | H01S 5/042 |
| | | | | 372/38.02 |

\* cited by examiner

WRITE CURRENT UNDERSHOOT FOR A HEAT-ASSISTED MAGNETIC STORAGE DEVICE

SUMMARY

Examples described herein involve an apparatus comprising a write head. A preamplifier is coupled to the write head. A controller is coupled to the preamplifier and configured to cause the preamplifier to apply an overshoot current to the write head for a predefined overshoot current duration, apply an undershoot current to the write head for a predefined undershoot current duration, and apply a steady-state current to the write head after the undershoot current duration, the steady-state current being greater than the undershoot current.

A method for modulating current in a heat assisted magnetic recording device comprises applying an overshoot current to a write head for a predefined overshoot current duration, applying an undershoot current to the write head for a predefined undershoot current duration, and applying a steady-state current to the write head after the undershoot current duration, the steady-state current being greater than the undershoot current.

An apparatus, comprises an interface circuit operable to communicate with a write head. A controller is coupled to the interface circuit, the controller operable to provide instructions to the interface circuit to apply an overshoot current to the write head for a predefined overshoot current duration, apply an undershoot current to the write head for a predefined undershoot current duration, and apply a steady-state current to the write head after the undershoot current duration, the steady-state current being greater than the undershoot current.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure generally relates to writing data to devices configured for heat-assisted magnetic recording or HAMR. This technology, also referred to as energy-assisted magnetic recording (EAMR), thermally-assisted magnetic recording (TAMR), and thermally-assisted recording (TAR), uses an energy source such as a laser and a near-field transducer to heat a small spot (referred to herein as a "thermal spot") on a magnetic disc during recording. The heat lowers magnetic coercivity at the thermal spot, allowing a write transducer to change magnetic orientation. Due to the relatively high coercivity of the medium after cooling, the data is less susceptible to superparamagnetic effects that can lead to data errors.

Figure 1:
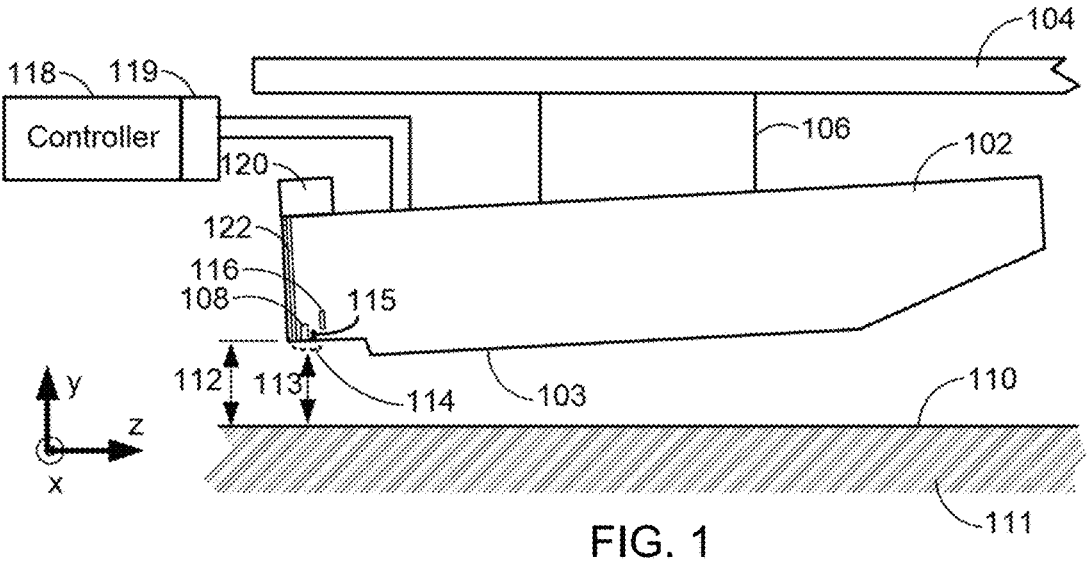
FIG. 1 is a block diagram of a heat-assisted magnetic recording (HAMR) head and media arrangement according to various embodiments described herein.

With reference now to FIG. 1, a block diagram shows a side view of a slider 102 according to a representative embodiment. The slider 102 may also be referred to as a recording head, read head, read/write head, head, etc. The slider 102 is coupled to a loadbeam 104 by way of a dimple 106 that allows some relative motion between the slider 102 and loadbeam 104. The slider 102 includes read/write transducers 108 at a trailing edge that are held proximate to a surface 110 of a magnetic recording medium 111, e.g., magnetic disc. When the slider 102 is located over surface 110 of recording medium 111, a flying height 112 is maintained between the slider 102 and the surface 110 by a downward force of loadbeam 104. This downward force is counterbalanced by an air cushion that exists between the surface 110 and an air bearing surface (ABS) 103 (also referred to as a "media-facing surface") of the slider 102 when the recording medium 111 is rotating. A thermal sensor 115 is shown situated at or near the close point 114 (e.g., adjacent the read/write transducers 108, such as near the NFT) or can be positioned at other locations of the ABS 103. The thermal sensor 115 can be configured for measuring temperature at or near the NFT and/or sensing temperature changes due to changes in slider fly height and head-to-medium contact, for example.

It is desirable to maintain a predetermined slider flying height 112 over a range of drive operating conditions (e.g., different rotational speeds, temperatures, humidities, etc.) during both reading and writing operations to ensure consistent performance. Region 114 is a "close point" of the slider 102, which is generally understood to be the closest point of contact between the read/write transducers 108 and the magnetic recording medium 111, and generally defines the head-to-media spacing 113. To account for both static and dynamic variations that may affect slider flying height 112, the slider 102 may be configured such that a region 114 of the slider 102 can be configurably adjusted during operation in order to finely adjust the head-to-media spacing 113. This is shown in FIG. 1 by dotted line that represents a change in geometry of the region 114. In this example, the geometry change may be induced, in whole or in part, by an increase or decrease in temperature of the region 114. To provide this type of control over dynamic/effective head-to-media spacing 113 via heat, the slider 102 may include (or otherwise be thermally coupled to) one or more heating elements 116. These heating elements 116 (e.g., resistance heaters) may be provided with selectable amounts of current by a controller 118.

Generally, the controller 118 at least includes logic circuitry for controlling the functions of an apparatus that includes at least the slider 102 and recording medium 111, and may include other components not shown, such as spindle motor, arm actuator, power supplies, etc. The controller 118 may include or be coupled to interface circuitry 119 such as preamplifiers, buffers, filters, digital-to-analog converters, analog-to-digital converters, etc., that facilitate electrically coupling the logic of the controller 118 to the analog signals used by the slider 102 and other components not shown.

Figure 2:
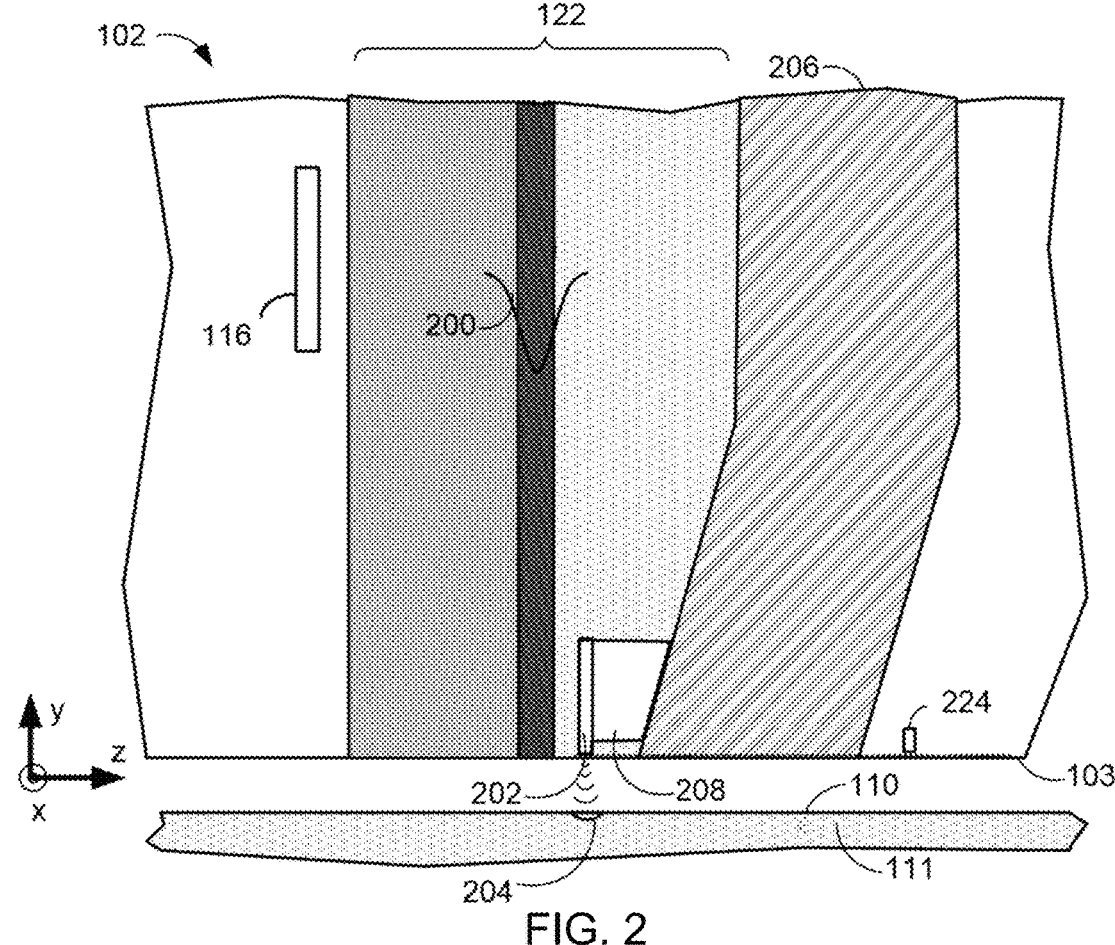
FIG. 2 is a cross-sectional view of a HAMR head according to various embodiments described herein.

In FIG. 2, a block diagram illustrates a cross-sectional view of the slider 102 according to a representative embodiment. An optical waveguide 122 receives electromagnetic energy 200 from an energy source (e.g., a laser source), the energy being coupled to an NFT 202. The NFT 202 is made of a metal (e.g., gold, silver, copper, etc.) that achieves surface plasmonic resonance in response to the applied energy 200. The NFT 202 shapes and transmits the energy to create a small thermal spot 204 on the surface 110 of medium 111. A magnetic write pole 206 causes changes in magnetic flux near the media-facing surface 103 in response to an applied write current. Flux from the write pole 206 changes a magnetic orientation of the thermal spot 204 as it moves past the write pole 206 in the downtrack direction (z-direction).

The slider 102 additionally includes the heating element (heater) 116 that may be used to adjust the protrusion of the write pole 206/NFT 202, a read transducer (not shown) and a sensor 224. A writer heater may be situated proximate a writer of the slider 102, and a reader heater may be situated proximate a reader of the slider 102. The sensor 224 may be used for various purposes, such as head-to-medium spacing measurements and contact detection. The sensor 224 may be a temperature coefficient of resistance (TCR) type sensor, for example, a dual-ended TCR (DETCR). The slider 102 further includes a heat sink 208 that is thermally coupled to the NFT 202. The heat sink 208 may be used to draw heat away, e.g., to the write pole 206 or other nearby heat-conductive components, as the heat at the thermal spot 204 increases.

Figure 3A:
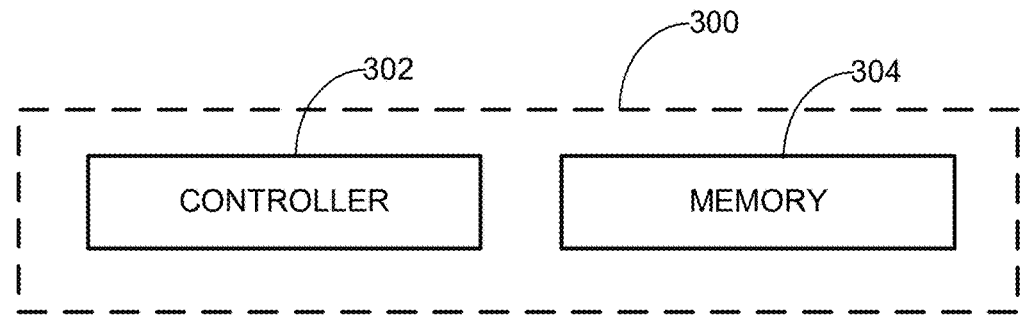
FIG. 3A is a simplified functional block diagram of a HAMR data storage device configured and operated in accordance with various embodiments of the present disclosure.

FIG. 3A is a simplified representation of a HAMR data storage device 300 of the type used to store and retrieve user data from a host device. The device 300 includes a controller (control circuit) 302 and a memory module 304. The controller 302 provides top level communication and control functions as the device interfaces with the host device. Data from the host device is transferred for storage in the memory 304.

In some cases, the controller 302 can take the form of a hardware or programmable processor with associated programming in a memory location to carry out the requisite control functions. The memory 304 can take any number of configurations to provide non-volatile storage of data, including but not limited to magnetic recording discs configured for HAMR, optical recording discs, etc. The memory 304 may include circuitry in the form of channel electronics, preamplifier/driver stages, spindle and actuation motors, etc.

Figure 3B:
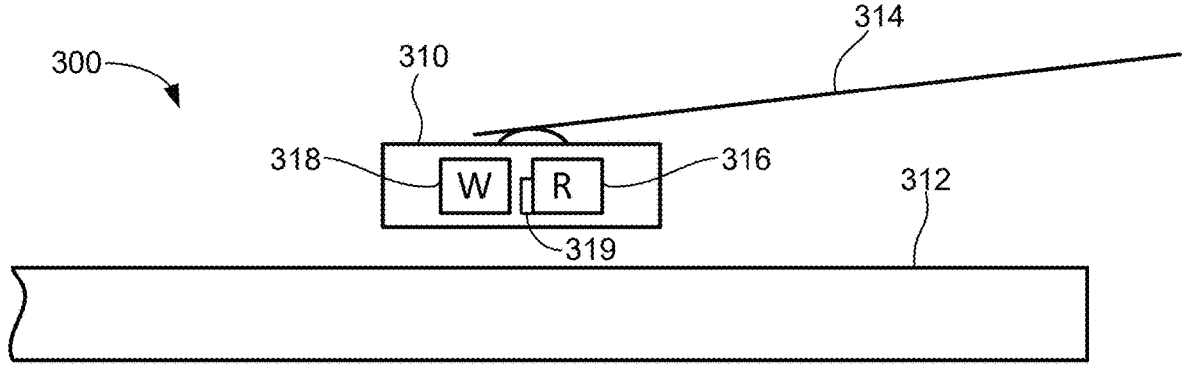
FIG. 3B shows a HAMR data transducer adjacent a data recording medium in accordance with some embodiments of the data storage device of FIG. 3A.

FIG. 3B shows an elevational representation of a data transducer 310 of the data storage device 300 of FIG. 1 in accordance with some embodiments. In FIG. 3B, the storage device 300 is characterized as a hard disc drive (HDD) configured for HAMR, although such is merely for purposes of providing a concrete example and is not limiting. The techniques disclosed herein are applicable to a wide variety of data storage devices configured for HAMR, including hybrid drives (e.g., HAMR plus SSD) for example.

The data transducer 310 is controllably positioned adjacent a magnetic recording medium (disc) 312 using a flexible suspension (flexure) member 314. In some cases, an air bearing surface (ABS) may be formed on a slider portion of the transducer 310 to maintain stable aerodynamic flight of the transducer 310 using fluidic atmospheric currents established by the high speed rotation of the disc 312.

The data transducer 310 (also referred to as a "head") includes a number of operative elements including a read (R) element 316, a write (W) element 318 (also referred to as a write pole), and an NFT 319 situated proximate the write pole 318. The read element 316 may take the form of a magnetoresistive (MR) sensor, and the write pole 318 may take the form of a perpendicular magnetic writing coil. Other forms for these elements can be used as desired. Additional operative elements can be incorporated into the transducer 310 such as a fly height adjustment (FHA) mechanism, contact sensors, etc.

Figure 3C:
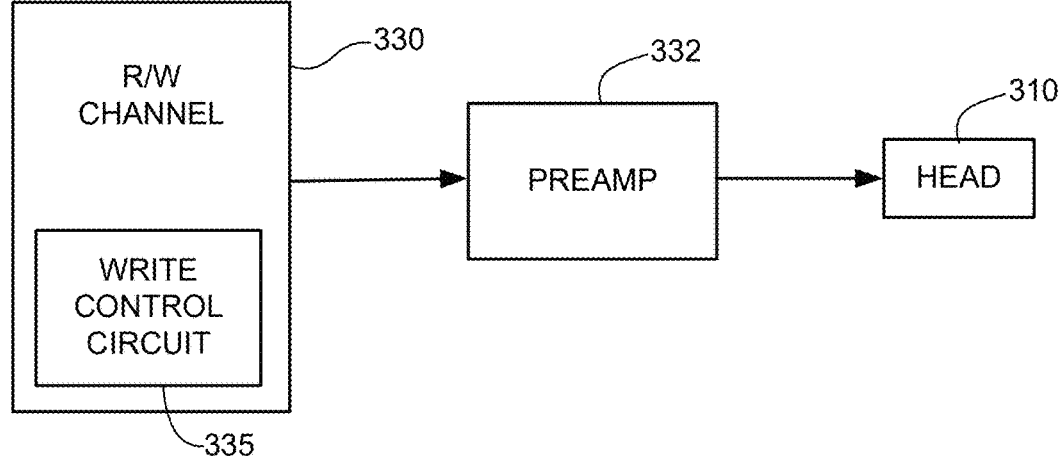
FIG. 3C shows the transducer (head) 310 of FIG. 3B in conjunction with a read/write (R/W) channel circuit and a preamplifier/driver circuit (preamp) in accordance with various examples.

FIG. 3C shows the transducer (head) 310 of FIG. 3B in conjunction with a read/write (R/W) channel circuit 330 including a write control circuit 335 and a preamplifier/driver circuit (preamp) 332. The channel 330 can be realized in a number of different hardware or programmable processor configurations, including SOC (system on chip) integrated circuit devices, programmable devices that use programming in memory to execute program steps, state machines, hardwired logic gates, transistors, etc. Regardless of form, the channel circuit includes encoding circuitry used during write operations to transition input write data to a sequence of symbols. The channel 330 further includes decoding circuitry used during read operations that reconstructs the originally written data from a recovered bit sequence corresponding to the originally written symbols. The preamp 332 includes write driver and read amplification and conditioning circuitry to interface with the transducer 310.

During a read operation, a readback signal is generated by the read sensor 316 (FIG. 3B). The pulses are used to adjust a variable clock oscillator (VCO) or similar circuit in the channel 330 to establish a readback clock that provides search windows at each T interval.

Figure 3D:
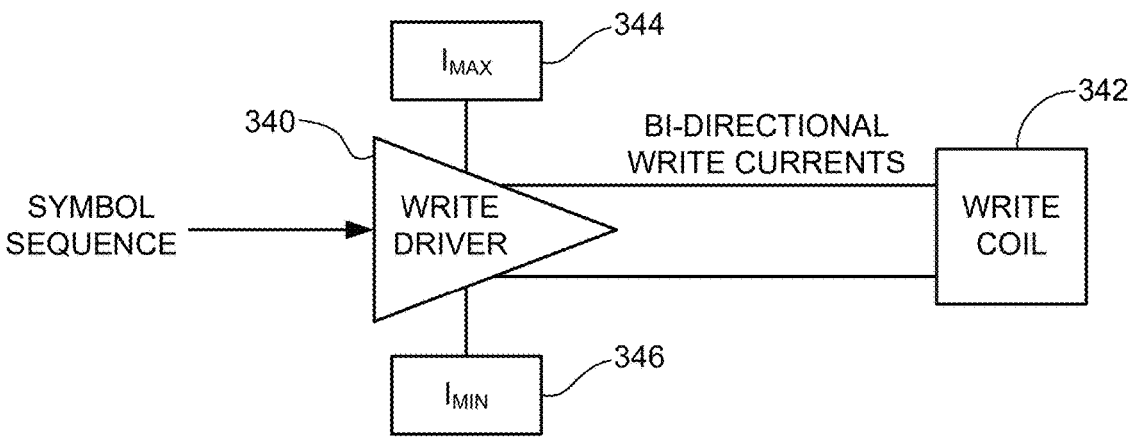
FIG. 3D shows a write driver circuit of the preamp of FIG. 3C according to various examples described herein.

FIG. 3D shows a write driver circuit 340 of the preamp 332 of FIG. 3C. The write driver circuit 340 can take any number of suitable forms, including an H-bridge circuit made up of power MOSFETs (metal oxide semiconductor field effect transistors) connected in an H-configuration, an operational amplifier circuit, a digital to analog converter (DAC) circuit, etc. Responsive to an input symbol sequence, the write driver 340 supplies bi-directional write currents to a write coil 342 of the write pole 318 (FIG. 3B). Except as modified below, the write currents nominally switch direction at each symbol boundary between a maximum rail current $I_{MAX}$ from current source 344 and a minimum rail current $I_{MIN}$ from current source 346. The rail currents can vary, but exemplary values may be ±25 milliamps, mA, etc. Any suitable current values can be used, including asymmetric values (e.g., +30 mA and −20 mA). Intermediate currents, such as zero currents, can be generated as a current between the maximum $I_{MAX}$ and minimum $I_{MIN}$ rail currents.

Rail voltage sources can be used by the write driver 340 in lieu of the current sources represented in FIG. 3D, but write currents will still be applied through the write coil 342 to effect the desired magnetization fields to magnetize the medium. Therefore, the present discussion will describe the write driver 340 in terms of applied write currents. This applies to other forms of write poles as well since even if voltages are applied, currents will flow through the write pole.

Magnetic recording Area Density Capability (ADC) in GB per square inch is one metric in current future hard disk drives. The ADC metric is the product of bit density (bits per inch or BPI) along a recording track and track density (tracks per inch or TPI) in the cross-track direction. both BPI and TPI gains can be achieved by simultaneously increasing peak write-current Ipk (Ipk=OSA+Iw), where OSA is the current overshoot amplitude and Iw is the steady-state write current) and decreasing the steady-state write current Iw. This is because increasing peak write-current (Ipk) makes the write pole switch faster with smaller field timing-jitter which improves BPI. However, the increased peak write-current (Ipk) degrades TPI through increased width of the erase bands, but decreasing the steady-state write-current (Iw) results in narrower erase bands, which, if Iw is low enough and/or the write current overshoot duration OSD is narrow enough, can more than compensate the increased peak write-current effect and in fact lead to a net TPI gain.

Figure 4:
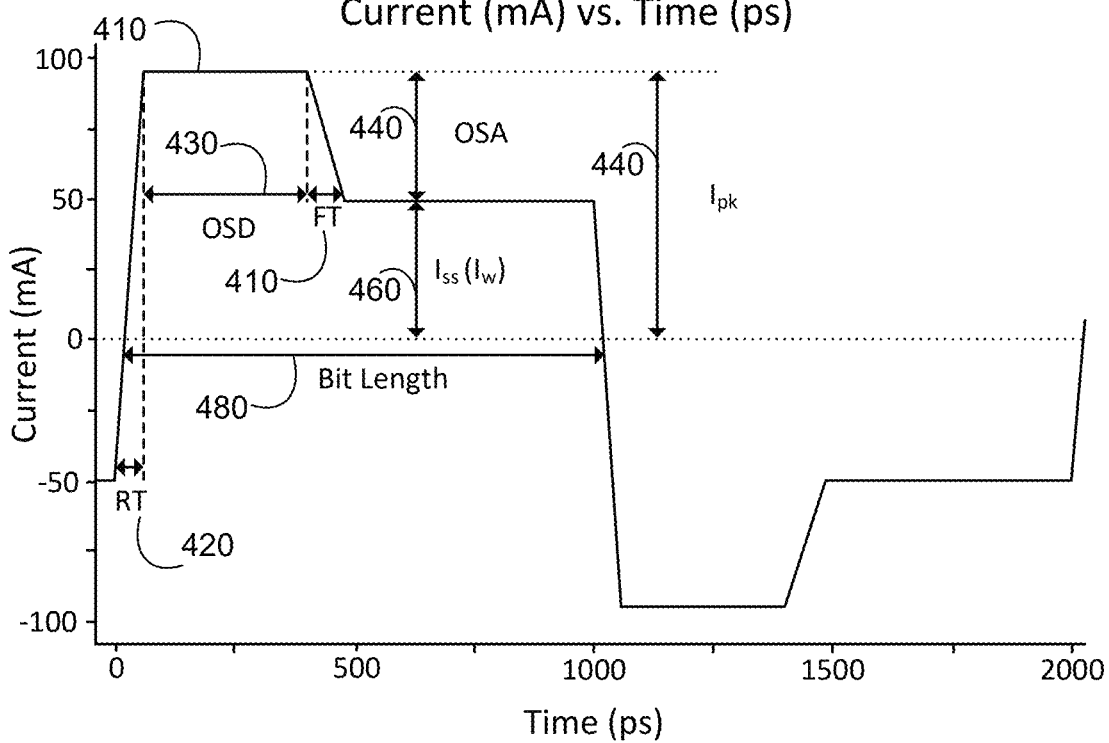
FIG. 4 illustrates an example of a write current waveform 410 in accordance with examples described herein.

FIG. 4 illustrates an example of a write current waveform 410 in accordance with examples described herein. The write current waveform includes the following components: a rise time (RT) 420, an overshoot duration (OSD) 430, an overshoot amplitude (OSA) 440 a fall time (FT) 450, a bit length 480, a peak current ($I_{pk}$) 470, and a steady state current ($I_{ss}$ or $I_w$) 460. In this example, Ipk 440 is applied after a rise time 420 for an overshoot duration (OSD) 430. After the overshoot duration 430, Iw 460 is applied after a fall time (FT) 410. The overshoot amplitude (OSA) 440 represents the difference between Ipk 440 and Iw 460.

Figure 5A:
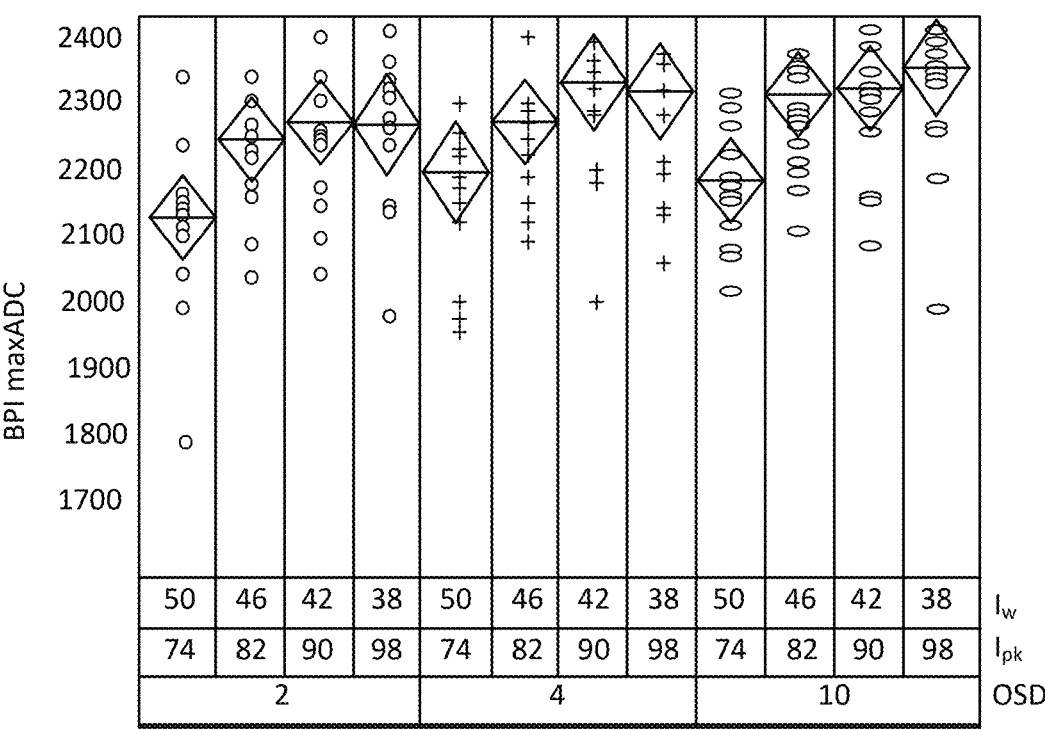
FIGS. 5A and 5B show examples of of both BPI and TPI gains by simultaneously increasing Ipk and decreasing Iw at a small OSD according to various examples.
Figure 5B:
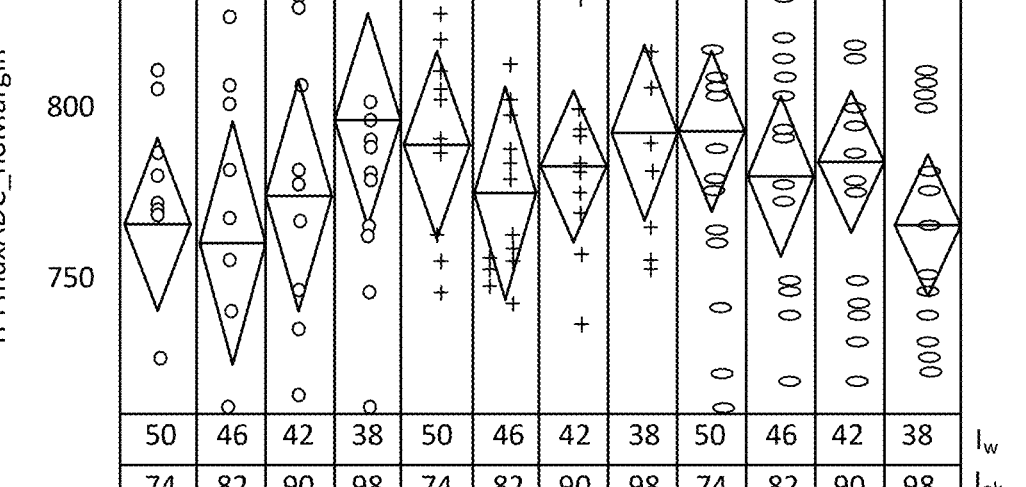

FIGS. 5A and 5B shows an example of both BPI and TPI gains by simultaneously increasing Ipk and decreasing Iw at a small OSD. In this example, for small enough OSD (here OSD=2), both BPI and TPI gains are achieved. According to various examples, the margin tests add a margin to track pitch for real drive applications. For example, the margin may be a constant value such as 3 nm, for example, or may be a constant percentage. The track pitch is the width of a track and its relationship with TPI can be expressed as track pitch (in nm)=25400/TPI. Here, TPI is in the unit of 1000 track per inch. The added margin to track pitch may reduce TPI.

Figure 6:
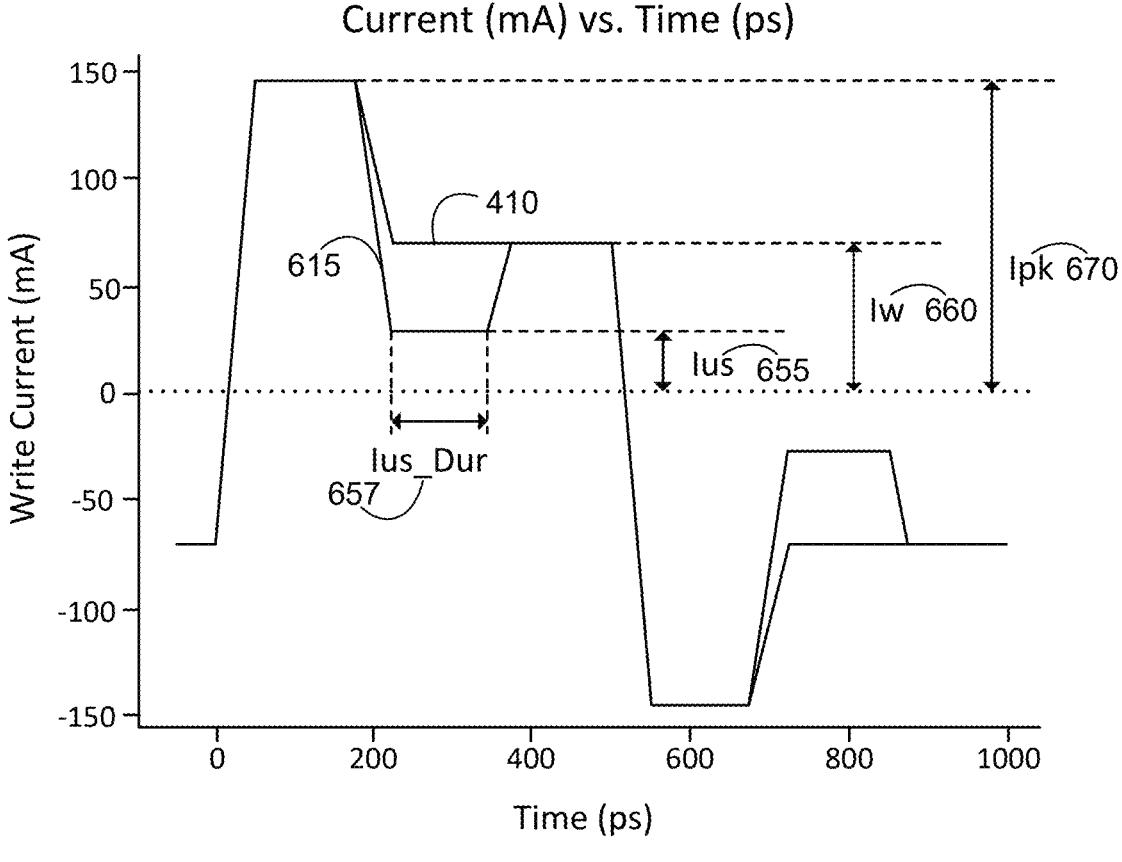
FIG. 6 shows write current waveform with an undershoot feature as well as a waveform without an undershoot feature according to examples described herein.

Examples described herein add an undershoot feature to the write current waveform to further improve ADC. FIG. 6 shows write current waveform with an undershoot feature as well as a waveform without an undershoot feature according to examples described herein. The write current waveform includes the following components: a rise time (RT) 620, an overshoot duration (OSD) 630, an overshoot amplitude (OSA) 640 a fall time (FT) 650, an undershoot current (Ius) 655, an undershoot duration, 657, a peak current (Ipk) 670, and a steady state current (Iss or Iw) 660. In this example, Ipk 670 is applied after a rise time for an overshoot duration. The overshoot duration may be in a range of about greater than 0 ps to about 500 ps or in a range of about 90 ps to 500 ps. After the overshoot duration, Ius 655 is applied for an undershoot duration 657. After the undershoot duration 657, Iw 660 is applied. According to various examples, one or both of the Ius 655 and the undershoot duration 657 are adjustable. For example, Ius 655 and the undershoot duration 657 may be chosen to account for a specific write head design. For example, Ius is in a range of 20% to 50% of Iw or in a range of 30% to 45% of Iw. In some examples, Ius is in a range of 20% to 40% of Iw. The undershoot duration may be in a range of about greater than 0 ps to 200 ps or in a range of 50 ps to 150 ps.

According to various examples, different writer designs (e.g., fast vs slow) use different undershoot current settings and Ius and the undershoot duration may be set in manufacturing based on the specific writer design. According to various examples, the undershoot duration is in a range of about 30 ps to 700 ps or in a range of 50 ps to 500 ps. The values of ADC gains by undershoot current may depend on the individual writer design. According to various examples, every writer design shows ADC gain from the current undershoot.

In some examples, for some writers with slow relaxation time and/or for short bit lengths, the undershoot current may be negative so that the write field can quickly be driven to a low value before returning the write-current to positive. The current through the coil changes "direction" for each bit (i.e. transition) that is written. The current can flow in a "positive" or "negative" direction. If a transition is written with a positive current, the current will increase in the positive direction to some peak value, it will then decrease to some "undershoot" value (but still in the positive direction), and then it will finally increase again to a steady-state value. In this example, the undershoot current is still in the "positive" direction (in the same direction as the steady state). According to some examples, the negative undershoot current is actually in the opposite direction as the peak and the steady-state currents meaning that the undershoot current is defined as being in the "negative" direction.

In some examples, 'negative' could be defined as being less than the steady-state current. In this example, it would still be in the positive direction, but it would be less than the steady-state, so it undershoot would effectively be subtracting from the steady-state (i.e. adding a negative).

In some examples, ADC gains may be achieved if pattern-dependent settings of the undershoot current are used. While long bits (2 T and above) should have already gained some TPI from the current experimental settings, long bits will gain more (not only gain more for TPI but also gain more for BPI) from the pattern-dependent setting.

Figure 7:
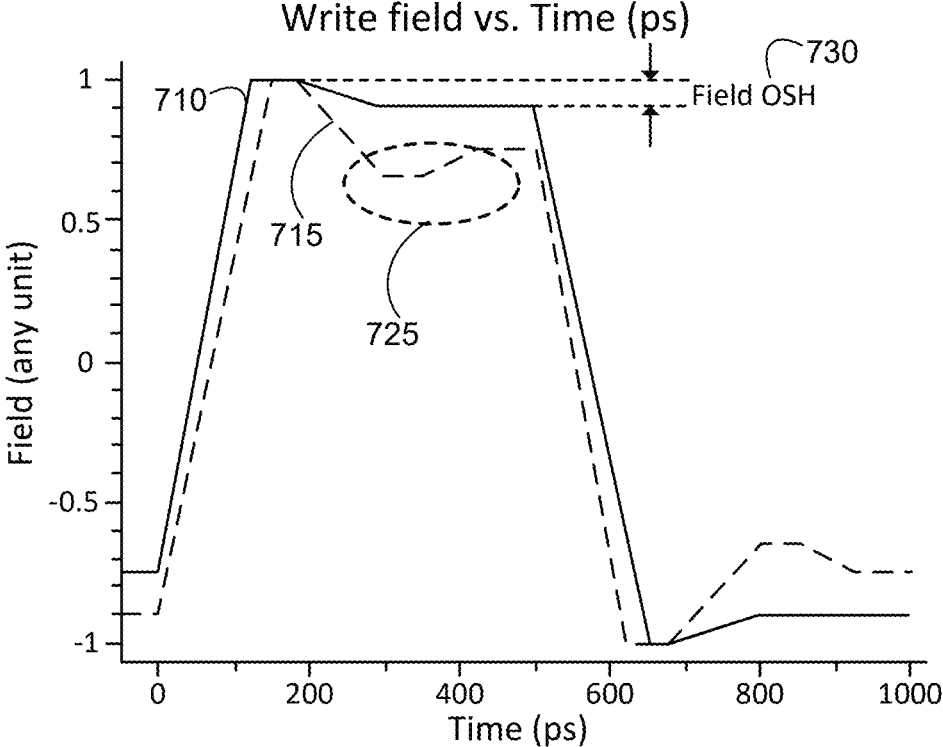
FIG. 7 shows the two different write current waveforms shown in FIG. 6 can lead to two different write field waveforms in accordance with various embodiments.

The two different write current waveforms shown in FIG. 6 (410, and 615) can lead to two different write field waveforms as shown in FIG. 7 (provided Ius and Ius_Dur are chosen properly for a given writer design). Compared to the field waveform that results from the write current waveform 710 illustrated in FIG. 4 having a field overshoot 730, the field waveform produced by the write current waveform 715 with an undershoot feature 725 may lead to ADC gain by two mechanisms: TPI gain due to narrower erasure bands that are the results of the lower write field in the steady-state region and BPI gain due to faster writer-pole transitions (and hence smaller field timing jitter) that are the results of a less saturated initial magnetized state.

Figure 8:
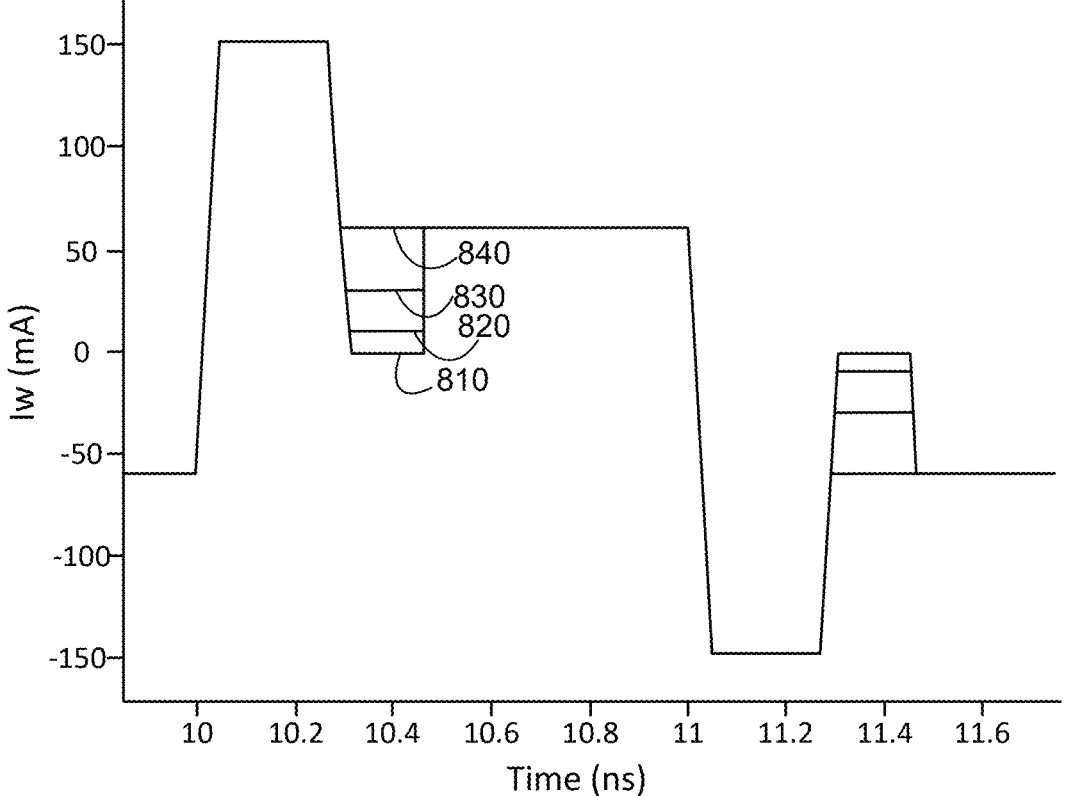
FIG. 8 illustrates write current waveforms with variable undershoot current values according to examples described herein.

FIG. 8 illustrates write current waveforms with variable undershoot current values according to examples described herein. In this example, undershoot currents of 0 mA 810, 10 mA 820, 30 mA 830, and 60 mA 840 are shown. In the example in which the undershoot current is 60 mA, there is no undershoot and the current waveform is similar to what is shown in FIG. 4.

Figure 9:
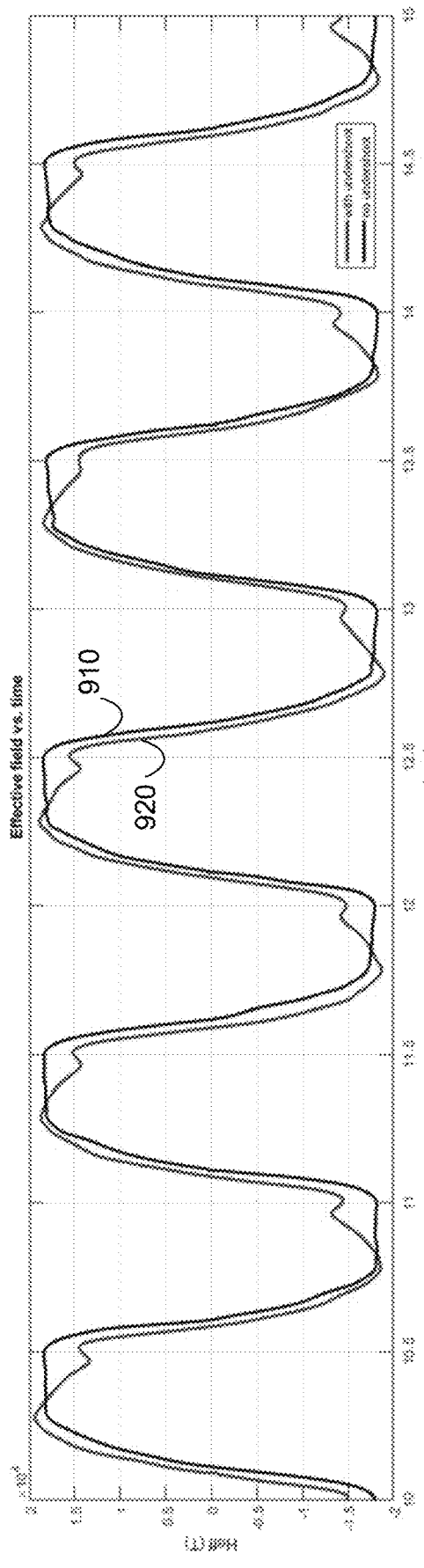
FIG. 9 shows modelling results of write field waveforms for one standard write-current waveform and for one write current waveform with an undershoot feature using a bit length of 500 ps.

FIG. 9 shows modelling results of write field waveforms for one standard write-current waveform 910 and for one write current waveform with an undershoot feature 920 using a bit length of 500 ps. The modeling results in FIG. 9 reveal two features of the write-field waveform for the write current with an undershoot feature: (1) weaker write-field in the steady-state region and this will reduce erase-bands and improve TPI, and (2) faster field rise time, but a higher peak field (that follows from the less saturated-in the opposite direction-magnetized initial writer-pole state). The faster field risetime will improve BPI, but the higher peak field may degrade TPI. According to various examples, a higher peak field-induced TPI degradation can be compensated by TPI gain from the lower steady-state write field (if a narrow OSD is used, for example).

Figure 10A:
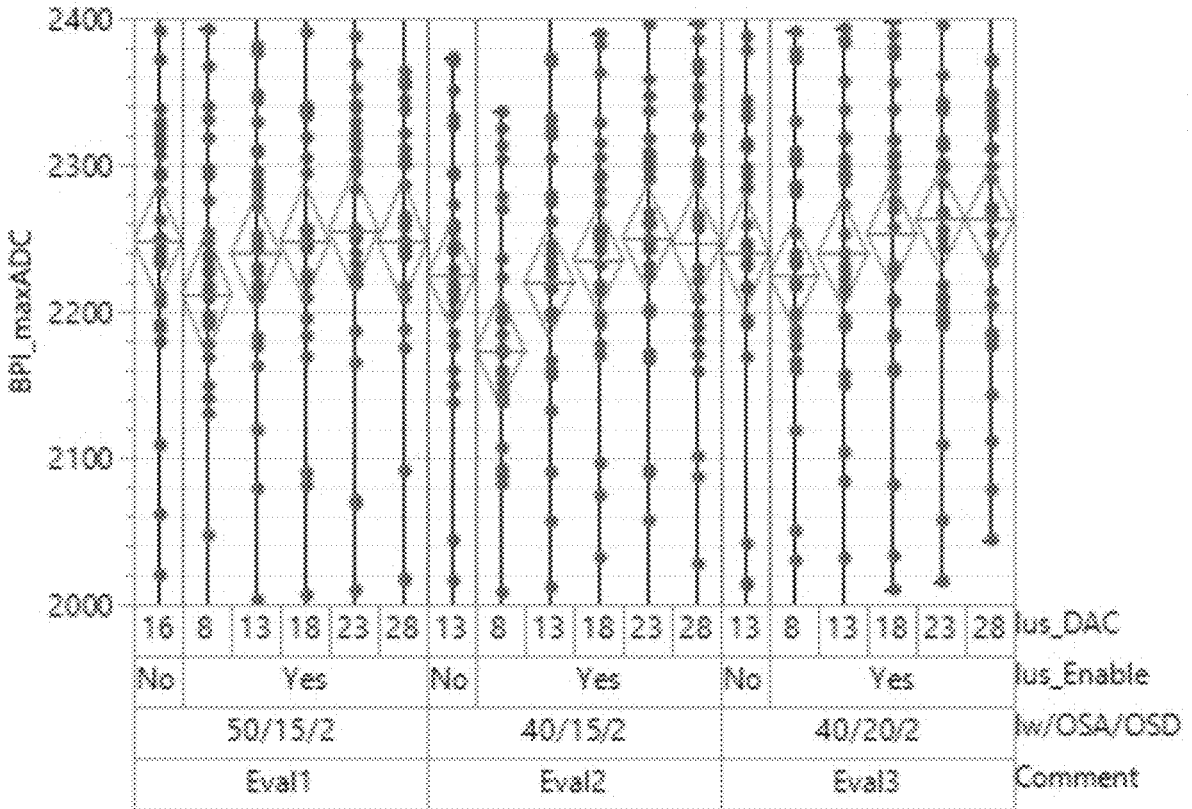
FIGS. 10A-10C illustrate experimental results of an impact of write current undershoot on BPI and TPI in accordance with embodiments described herein.
Figure 10B:
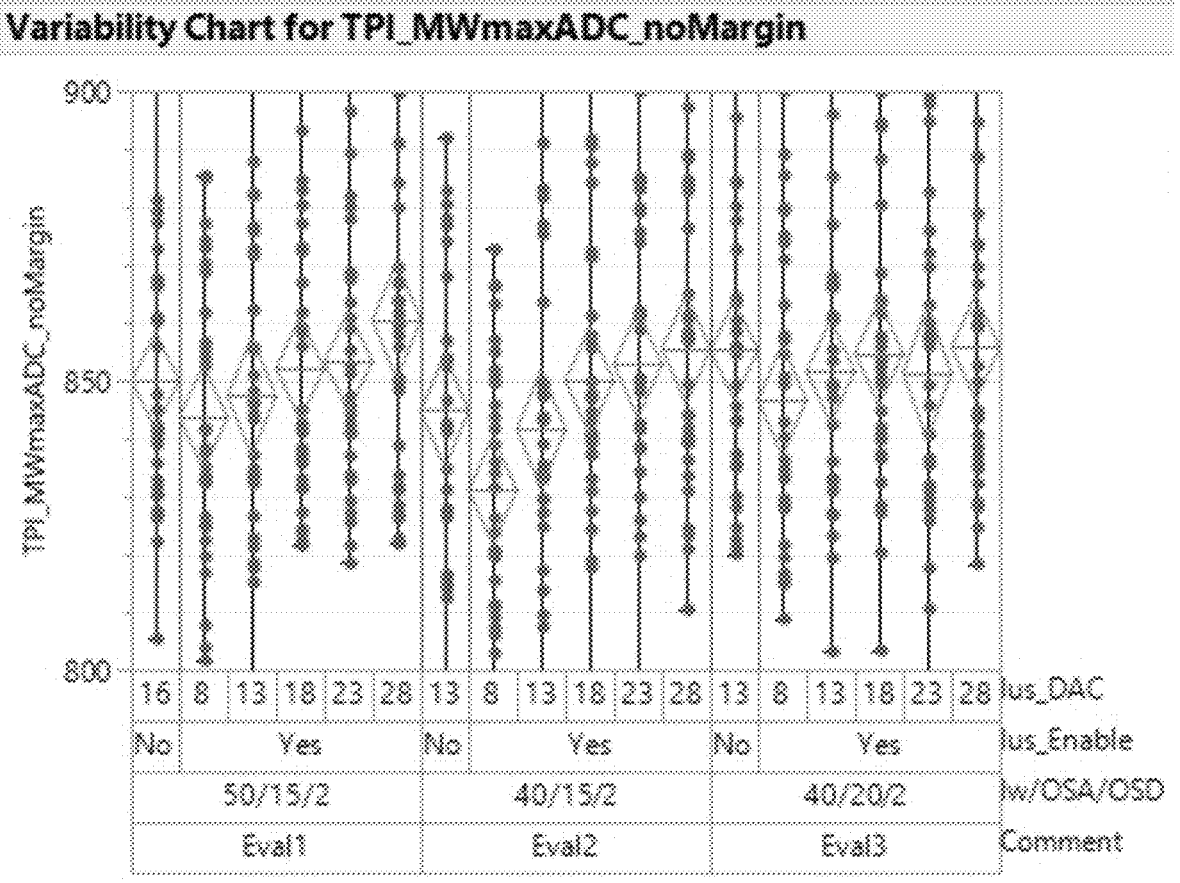
Figure 10C:
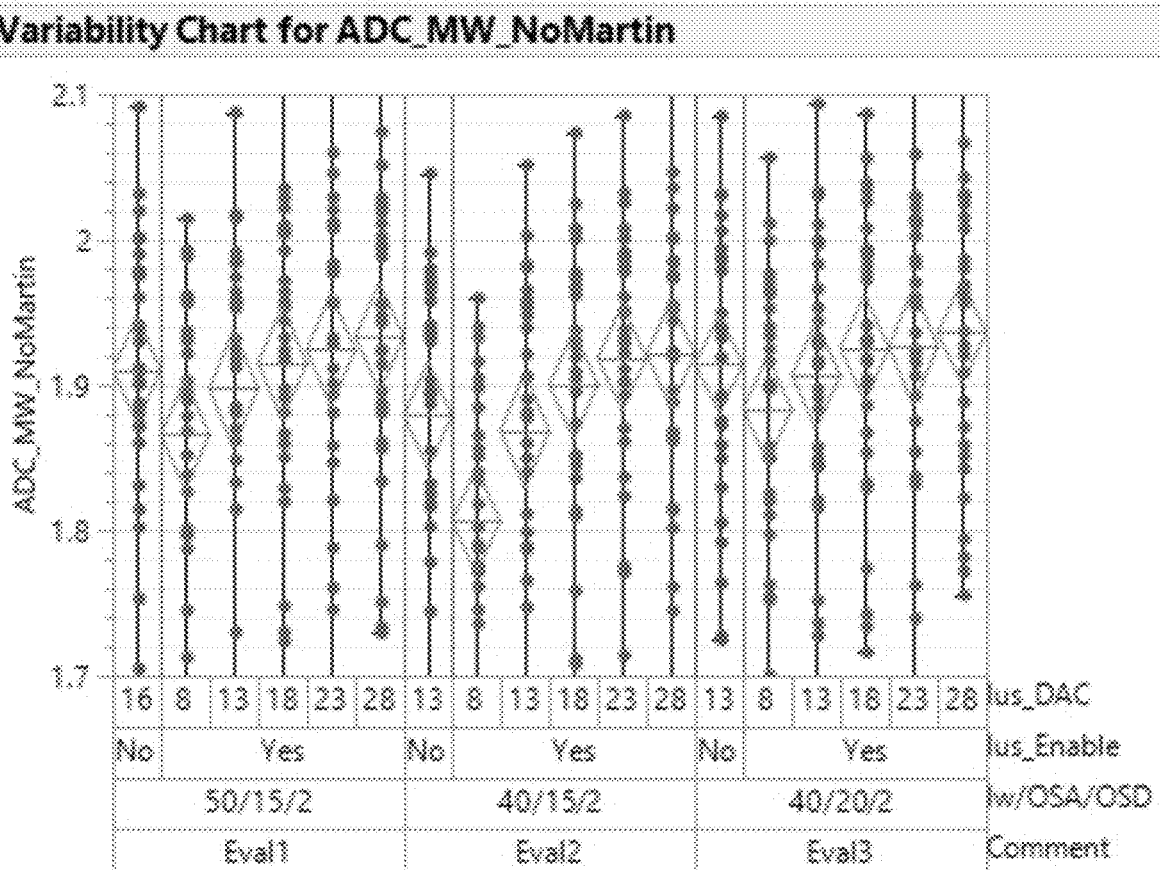

FIGS. 10A-10C illustrate experimental results of an impact of write current undershoot on BPI and TPI in accordance with embodiments described herein. The results show an ADC gain of ~2.0% at some favorable Ius and Ius_Dur settings when compared to a standard write current waveform. In this example, Iw=40 mA, OSA=15 mA, and OSD=2 ps. Both BPI and PI gains are clearly observed.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. A heat-assisted magnetic recording device, comprising:
a write head comprising a near-field transducer configured to transmit energy to create a thermal spot on a recording medium; and
a preamplifier coupled to the write head; and
a controller coupled to the preamplifier and configured to cause the preamplifier to:
apply an overshoot current to the write head for a predefined overshoot current duration during writing of a bit;
apply an undershoot current to the write head for a predefined undershoot current duration during writing the bit; and
apply, after the undershoot current duration, a steady-state current to the write head during writing the bit and while the near-field transducer is transmitting energy to the recording medium, the steady-state current being greater than the undershoot current.

2. The device of claim 1, wherein at least one of the undershoot current and the undershoot current duration are adjustable.

3. The device of claim 1, wherein the undershoot current is in a range of 20% to 50% of the steady-state current.

4. The device of claim 1, wherein the undershoot current is in a range of 30% to 45% of the steady-state current.

5. The device of claim 1, wherein the undershoot current is negative.

6. The device of claim 1, wherein the undershoot duration is in a range of 30 ps to 700 ps.

7. The device of claim 1, wherein the undershoot duration is in a range of 50 ps to 500 ps.

8. The device of claim 1, wherein the overshoot duration is in a range of about 90 ps to about 500 ps.

9. A method for modulating current in a heat assisted magnetic recording device comprising:
applying an overshoot current to a write head for a predefined overshoot current duration during writing of a bit;
applying an undershoot current to the write head for a predefined undershoot current duration during writing of the bit; and
applying, after the undershoot current duration, a steady-state current to the write head during writing of the bit and while a near-field transducer is transmitting energy to a recording medium, the steady-state current being greater than the undershoot current.

10. The method of claim 9, wherein at least one of the undershoot current and the undershoot current duration are adjustable.

11. The method of claim 9, wherein the undershoot current is in a range of 20% to 40% of the steady-state current.

12. The method of claim 9, wherein the undershoot current is negative.

13. The method of claim 9, wherein the undershoot duration is in a range of 30 ps to 700 ps.

14. The method of claim 9, wherein the undershoot duration is in a range of 50 ps to 500 ps.

15. The method of claim 9, wherein the overshoot duration is in a range of about 90 ps to about 500 ps.

16. An apparatus, comprising:
an interface circuit operable to communicate with a write head, the write head comprising a near-field transducer configured to transmit energy to create a thermal spot on a recording medium;
a controller coupled to the interface circuit, the controller operable to provide instructions to the interface circuit to:
apply an overshoot current to the write head for a predefined overshoot current duration during writing of a bit;
apply an undershoot current to the write head for a predefined undershoot current duration during writing of the bit; and
apply, after the undershoot current duration, a steady-state current to the write head during writing the bit and while the near-field transducer is transmitting energy to the recording medium, the steady-state current being greater than the undershoot current.

17. The apparatus of claim 16, wherein the interface circuit comprises a preamplifier.

18. The apparatus of claim 16, wherein at least one of the undershoot current and the undershoot current duration are adjustable.

19. The apparatus of claim 16, wherein the undershoot current is in a range of 20% to 50% of the steady-state current.

20. The apparatus of claim 16, wherein the undershoot current is in a range of 30% to 45% of the steady-state current.

* * * * *